United States Patent
McGough

(10) Patent No.: US 7,251,912 B2
(45) Date of Patent: Aug. 7, 2007

(54) BIODEGRADABLE DEVICE FOR IRRIGATING SEEDLINGS AND OTHER SMALL PLANTS

(76) Inventor: Charles Brownell McGough, 3 Marshbridge La., Savannah, GA (US) 31411

(*) Notice: Subject to any disclaimer, the term of this patent is extended or adjusted under 35 U.S.C. 154(b) by 0 days.

(21) Appl. No.: 11/408,885

(22) Filed: Apr. 24, 2006

(65) Prior Publication Data
US 2006/0283079 A1 Dec. 21, 2006

Related U.S. Application Data

(60) Provisional application No. 60/690,723, filed on Jun. 16, 2005.

(51) Int. Cl.
*A01G 27/00* (2006.01)
*A01G 9/02* (2006.01)
(52) U.S. Cl. .......................... 47/48.5; 47/65.8
(58) Field of Classification Search ................ 47/48.5, 47/65.8, 24.1, 74, 79; 383/1, 106, 100–103, 383/109–116
See application file for complete search history.

(56) References Cited

U.S. PATENT DOCUMENTS

| | | | | |
|---|---|---|---|---|
| 2,375,860 A | * | 5/1945 | Markham | 47/48.5 |
| 2,387,869 A | * | 10/1945 | Chatten | 57/90 |
| 2,595,783 A | * | 5/1952 | Epstein | 280/32.6 |
| 4,089,133 A | * | 5/1978 | Duncan | 47/48.5 |
| 4,300,309 A | * | 11/1981 | Mincy | 47/48.5 |
| 4,336,666 A | * | 6/1982 | Caso | 47/48.5 |
| 4,554,761 A | * | 11/1985 | Tell | 47/1.41 |
| 4,578,897 A | * | 4/1986 | Pazar et al. | 47/48.5 |
| 4,970,823 A | * | 11/1990 | Chen et al. | 47/48.5 |
| 5,117,582 A | * | 6/1992 | Cissel et al. | 47/32.4 |
| 5,171,439 A | * | 12/1992 | Vakharia | 383/100 |
| 5,252,302 A | * | 10/1993 | Schmidt et al. | 422/261 |
| 5,259,142 A | * | 11/1993 | Sax | 47/48.5 |
| 5,443,544 A | * | 8/1995 | Azoulay | 47/48.5 |
| 5,564,223 A | * | 10/1996 | Takita | 47/24.1 |
| 5,809,692 A | * | 9/1998 | Kesler | 47/48.5 |
| 5,896,700 A | * | 4/1999 | McGough | 47/48.5 |
| 5,992,635 A | * | 11/1999 | Walters | 206/524.8 |
| 6,243,986 B1 | * | 6/2001 | Crowley | 47/48.5 |

(Continued)

FOREIGN PATENT DOCUMENTS

JP 403172120 A * 7/1991

(Continued)

*Primary Examiner*—Son T. Nguyen

(57) ABSTRACT

This invention is a device for irrigating tree seedlings and other small plants, to ensure that said plants stay moist in the critical few weeks following their planting. The device uses a bag, approximately 1 gallon capacity, constructed of biodegradable plastic, such as cornstarch, which slowly degrades into the soil so as to not leave residue in the planting field. The bag has a top filling opening with an adhesive sealing flap, and contains a multi-layered disk which acts as a passive valve which permits the slow drip-release of water from the bag over a 2-3 week period following planting. The multi-layered disk is made of two layers of thin plastic, a layer of special laboratory filter paper, and a layer of adhesive-sided gasket material which attaches said disk to said biodegradable bag. The design of the hole patterns in the layers of the disk, and the assembly and precise compression of said layers during manufacture, result in a device that produces the desired slow-release flow characteristics.

1 Claim, 2 Drawing Sheets

U.S. PATENT DOCUMENTS

| | | | |
|---|---|---|---|
| 6,251,489 B1 * | 6/2001 | Weiss et al. | 428/35.2 |
| 6,289,630 B1 * | 9/2001 | Hetze et al. | 47/41.01 |
| 2003/0103694 A1 * | 6/2003 | Cook | 383/113 |
| 2003/0178066 A1 * | 9/2003 | Skeens et al. | 137/512.15 |
| 2005/0281494 A1 * | 12/2005 | Allen et al. | 383/109 |
| 2006/0037884 A1 * | 2/2006 | Doyle et al. | 206/524.8 |

FOREIGN PATENT DOCUMENTS

JP          405124656 A  *  5/1993

* cited by examiner

BIODEGRADABLE DEVICE FOR IRRIGATING SEEDLINGS AND OTHER SMALL PLANTS

CROSS REFERENCE TO RELATED APPLICATIONS

This application claims priority to, and the benefits of, U.S. Provisional Patent Application Ser. No. 60/690,723 filed on Jun. 16, 2005.

STATEMENT REGARDING FEDERALLY SPONSORED RESEARCH OR DEVELOPMENT

Not applicable

REFERENCE TO SEQUENCE LISTING

Not applicable

BACKGROUND OF THE INVENTION

1. Field of Endeavor

This invention pertains to the field of plant husbandry (Class 047), specifically to the irrigation of newly planted tree seedlings and other small plants.

2. Prior Art

U.S. Pat. No. 5,896,700 *Device for Watering Unattended Houseplants* (McGough), describes a device which dispenses a quantity of water (typically 32 or 16 ounces) to a potted houseplant over an extended period of time (typically 1 to 2 weeks or more) without owner intervention. The bottle-type device is completely passive, operates by gravity flow, uses standard tap water, and solves a number of problems not addressed by earlier houseplant watering devices. The -700 device is comprised of three major components, one of which is a disk-shaped sandwich-type wafer constructed of several layers of gasket material, laboratory filter paper, and thin plastic, having through-holes and passages so constructed as to filter impurities from the water and control the rate at which water is released from the reservoir during the desired watering period. The -700 device dispenses the reservoir water over a specified time period, releases its water at a relatively uniform rate during the watering cycle, uses standard tap water, and is simple to manufacture and install. The -700 device has been on the market for several years and has proven to be an effective method for watering a wide variety of unattended houseplants.

Another device, called a *Tree Irrigator* (U.S. Pat. No. 5,117,582, Cissel, Jr. et.al) utilizes a large flexible plastic bag (typically 20 gallon capacity) which encircles the trunk of a small tree, and which contains small holes in its base to dispense water over a period of time (typically 6-8 hours) to the tree.

Other prior devices have been suggested for irrigating unattended plants, and number of these have received U.S. patents.

U.S. Pat. No. 5,443,544 (Azoulay) describes a device which uses a wick and water-absorbing sponge to transfer water to the plant.

U.S. Pat. No. 4,970,823 (Chen and Parkhurst) describes another wick-type system for dispensing water from a bottle reservoir to the soil.

U.S. Pat. No. 4,578,897 (Pazar and Petrick) describes a system for dispensing water to a water dish located below the plant.

U.S. Pat. No. 4,336,666 (Caso) describes a toroidal-shaped device which requires the operator to punch holes in the "metering nozzles" to obtain the desired flowrate.

U.S. Pat. No. 4,300,309 (Mincy) uses a "porous soil penetrating member" to dispense water from semi-toroid shaped reservoir to the soil.

Similarly, U.S. Pat. No. 4,089,133 (Duncan), U.S. Pat. No. 2,387,869 (Chatten), U.S. Pat. No. 2,595,783 (Epstein), and U.S. Pat. No. 2,375,860 (Markham) attempt to solve the problem of watering plants with various wicking, porous ceramic absorption, or multiple aperture devices.

U.S. Pat. No. 5,259,142 (Sax) employs a simple filter to restrict the flow of water from a rigid bottle, but provides no means of preventing the filter from becoming clogged by impurities in the water, nor means of sealing its filter disk against peripheral leakage.

All of the above patents describe various methods for automatically dispensing water to growing plants. However, only the first patent cited (U.S. Pat. No. 5,896,700) bears any similarity in design or operating principle to the device disclosed herein. The -700 device uses a multilayered disk made of layers of thin plastic, filter paper, and gasket to filter and regulate the slow drip of the water from a plastic bottle over an extended period of time (typically 1-2 weeks). In the -700 device the disk is compressed between the lip of a plastic bottle and a hard plastic spike which is threaded on to the bottle neck. The device described in this application uses a similar multi-layered disk to dispense 3-4 quarts of water over 2-3 weeks, except such disk is designed to be used with a flexible biodegradable bag, rather than the rigid plastic bottle and cap used in the -700 device.

A number of other patents and applications describe devices which have some slight similarities to features of the device disclosed in this application. For example: U.S. Pat. No. 4,554,761 (Tell) is a flexible cover used to protect a plants' reproductive organs from pollination; U.S. Pat. No. 5,252,302 (Schmidt) is a container with an internal cavity which holds a porous bag containing manure and compost; U.S. Pat. No. 5,564,223 (Takita) describes a quick-peelable protective wrap for fruit on a tree; U.S. Pat. No. 5,809,692 (Kesler) is a plant feeder consisting of a water reservoir and connecting conduit; U.S. Pat. No. 5,992,635 (Walters) discloses a pressure release valve for flexible vacuum packages; U.S. Pat. No. 6,243,986 (Crowley) is a plant care system consisting of a root-feeding spike which is gravity fed through a line from a reservoir or bottle; U.S. Pat. No. 6,251,489 (Weiss) is a sterilizable flexible pouch package used for sterilizing objects by steam; U.S. Pat. No. 6,289,630 (Hetze) is a device used to keep flowers fresh by mixing nutrients with liquids; US 2003/010394 (Cook) is a one-way concealed-valve sterilizing objects by steam; U.S. Pat No. 6,289,630 (Hetze) is a device used to keep flowers fresh by mixing nutrients with liquids; US 2003/010394 (Cook) is a one-way concealed-valve vented storage bag; US 2003/0178066 (Skeens) is an evacuable container having a one-way valve with filter element; US 2005/0178066 (Allen) describes a method for forming a vented bag; U.S. Pat. No. 5,171,439 (Vakharia) discloses a liquid non-leaking gas venting seal for a container holding liquid; US 2006/0037884 (Doyle) is a plastic bag for fine powders; JP405124656A (Yamaguchi) describes an air evacuation feed packaging bag and its valve structure and aeration preventing body. This bag, for vacuum cleaners, uses adhesive tape attached to the opposite walls of its inner surface to mount an air suction valve; JP 403172120A (Nishizawa)

describes a device for packaging plants, using water-holding polymer materials in a baglike unit, to keep cut plants fresh for a long period.

None of the fifteen patents or applications described in the previous paragraph anticipate any of the key features of the device described in this application, and none could be used in any way to provide water to seedlings over an extended period, as does this invention.

SUMMARY OF THE INVENTION

The device disclosed herein is a modification and new application of the invention covered by U.S. Pat. No. 5,896,700 described in the previous section. This biodegradable one-time-use device is designed to provide water to newly planted tree seedlings and other similar small plants to prevent them from drying out in the critical 2-3 week period after planting. The device is comprised of two main components: (1) a unique version of the flow-control wafer described in the –700 patent, herein called a drip-control disk, and (2) a biodegradable plastic bag made of cornstarch or other similar material, capable of holding, typically, 1 gallon of water, having a sealable top opening for filling the water, and into which is permanently installed the drip-control disk. After the bag is filled with water and sealed, it is placed near the base of the newly-planted seedling or plant, with the drip-control disk downward, where it will slowly release its water over a specified time period (typically 2-3 weeks) to keep the plant roots moist. After the bag empties it will slowly degrade into the soil, typically over 40-45 days, so as to not leave debris in the forest or planting area.

DETAILED DESCRIPTION OF THE INVENTION

Figure 1:
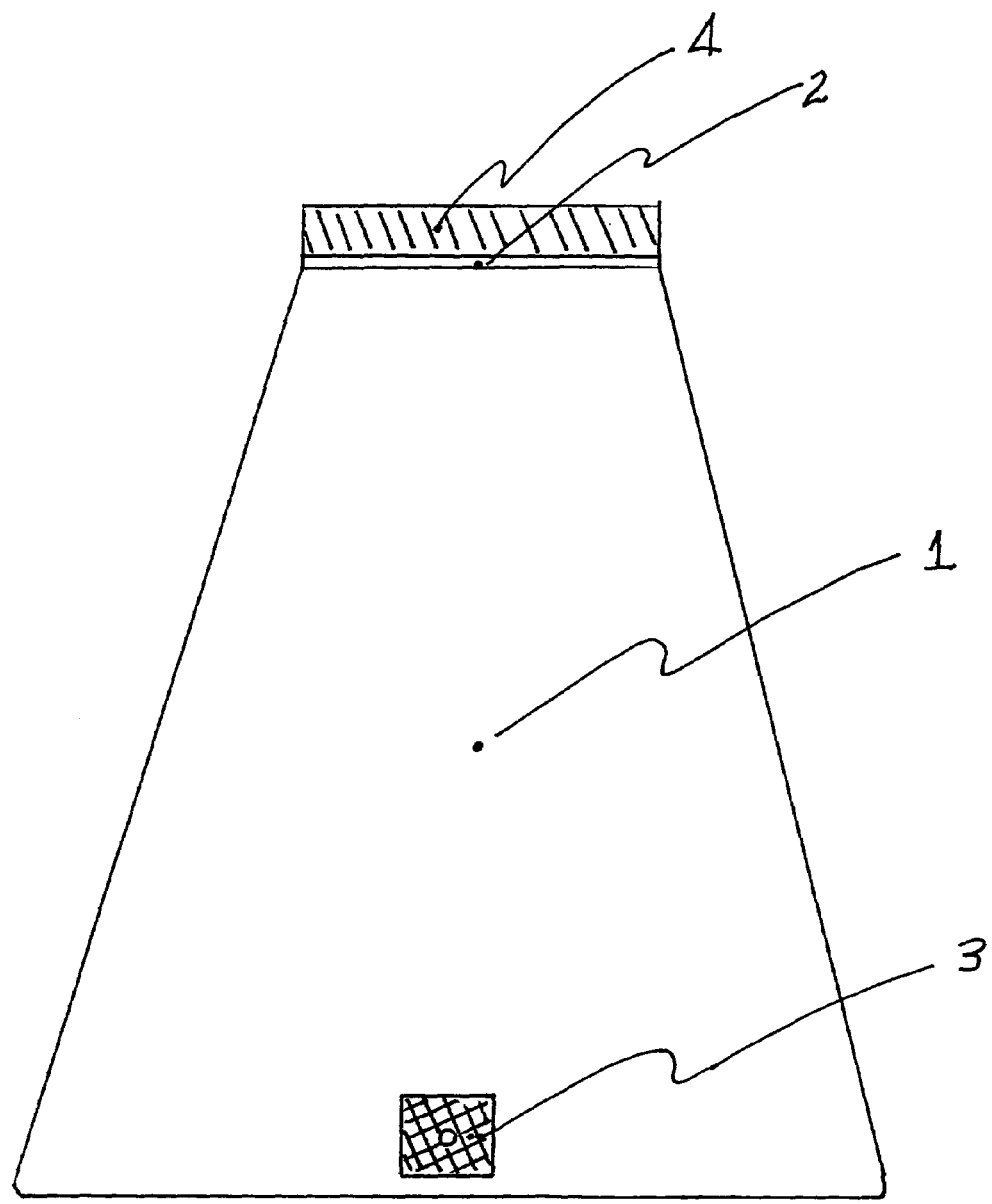
FIG. 1 shows the biodegradable plastic bag (approx 1 gallon capacity) with sealable top filling opening and drip-control disk. The top filling opening is shown in its open position. The sealing flap contains a layer of double-back paper tape for sealing the flap to the bag.

A device for irrigating seedlings and other small plants, especially in the period immediately following planting, to ensure that the roots of said plantings remain moist, consists of: (1) a biodegradable plastic bag 1 having a typical capacity of 1 gallon of water, said bag having a sealable top opening 2 and, at the bottom, a multi-layered drip-control disk 3 which controls the rate at which water is slowly released from the bag. In the preferred embodiment the sealable top opening has a double-back paper tape strip 4 which will enable the operator to quickly fill, close, and place the bag by the plant. Other type closures may also be used.

The drip-control disk will release the contents of the bag over the desired period, typically 3 quarts over 2-3 weeks. Alternatively, other capacities and release times may be used, depending on the specific needs of the plant.

FIG. 1 is an overall view of the device showing the biodegradable plastic bag with sealable top fill port and the drip-control disk near the bottom. The configuration of the bag shown is basically triangular, although other shapes, such as rectangular, can also be used as long as the sealable fill port is at or near the top of the bag.

The bag is thin-walled (typically 0.001 inch or less) and made of a material, such as plasticized cornstarch, which degrades into the soil when exposed to sunlight and moisture over a period of time, typically 40-45 days. Such bags are commonly used in many applications where environmental considerations are important.

The multi-layered drip-control disk is located on or near the bottom of the bag, as shown in FIG. 1, so that it can be placed very near to the base of the seedling or small plant to ensure that the water soaks the roots as it drips from the filled bag.

Figure 2A:
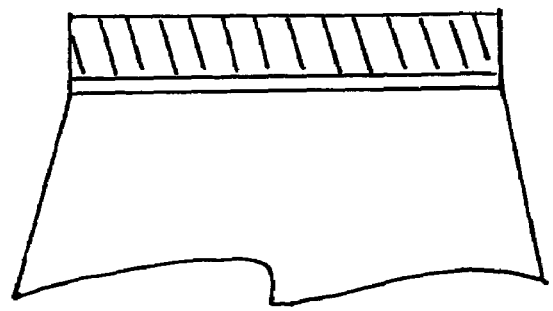
FIG. 2a and FIG. 2b show the bag's double-back paper tape closure in its open and sealed positions.
Figure 2B:
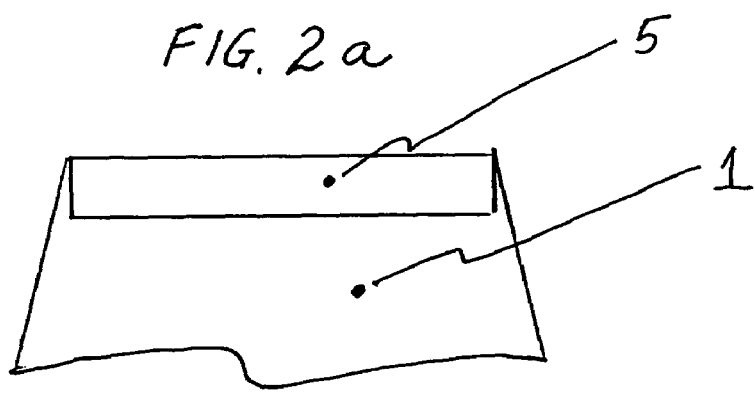

Also, as shown in FIG. 1, the fill port of the bag has a closure flap upon which is attached a strip of double-back paper adhesive tape. After the bag is filled with water to the desired level, the operator removes the backing from the double-back paper tape and seals the closure flap to the bag, as shown in FIG. 2a(open) 4 and FIG. 2b(sealed) 5. Because this is a one-time use product, the bag is not intended to be re-opened and this simple inexpensive closure method can be used in lieu of more expensive re-closable systems.

Figure 3:
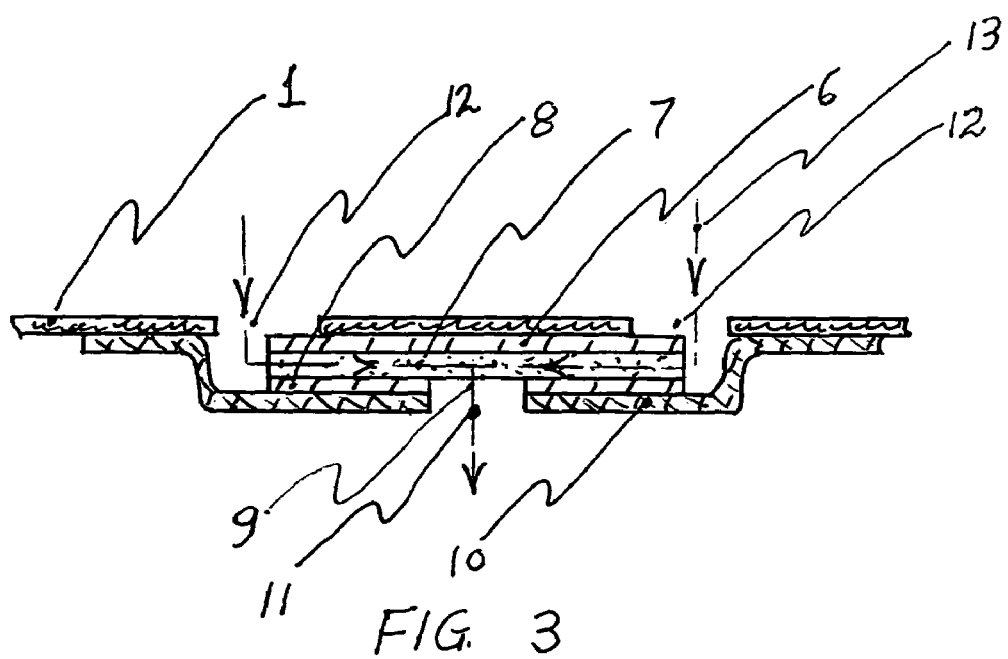
FIG. 3 shows details of the critical drip-control disk, which controls the rate at which water is slowly released from the bag into the soil surrounding the seedling or other small plant.

FIG. 3 shows details of the drip-control disk, as attached to the biodegradable plastic bag 1. The disk consists of four layers. (1) a top layer of thin plastic sheet 6, approximately 1 inch in diameter, said plastic having a layer of adhesive material on its lower surface; (2) a layer of special laboratory filter paper 7, also approximately 1 inch in diameter; (3) a second layer of thin plastic sheet 8, also approximately 1 inch in diameter, said layer having a layer of adhesive material on its top surface and a center hole 9 approximately ¼ inch in diameter, and (4) a rectangular or circular shaped layer of thin flexible gasket material 10 somewhat larger than the disk made up of layers 1,2, and 3, and having adhesive on its top surface and a small hole 11, approximately ¼ inch in diameter in its center.

Layers 1,2, and 3 are assembled so that the adhesive layers of the two plastic sheets touch the filter paper and bond the three layers together into a single three-layer subassembly.

Said subassembly is then compressed in a press by a predetermined amount as determined by testing, so that the adhesive is driven into the surfaces of the filter paper to create a flow path resistance which will cause the installed drip-disk to release all of the water in the bag in the desired 2-3 week period.

The circle-shaped subassembly disk is then placed on the outside surface of the bag between two small holes 12, each approximately ¼ inch in diameter, located near the bottom of the bag. Said small holes are separated by a distance equal to the diameter of the subassembly disk.

The open edges of the filter paper in said subassembly disk thus intersect the two small holes in the bag. The thin gasket sheet is then placed over said subassembly disk, adhesive side up, so that the center holes of the subassembly disk and the flexible gasket sheet are concentric. The flexible gasket sheet is then pressed down firmly to seal the subassembly disk against the outer surface of the biodegradable plastic bag.

To irrigate seedlings and small plants, the operator fills the bag with water through its top filling opening, removes the backing layer from the strip of double-back paper tape, folds said strip and presses it against the surface of the bag to seal the opening. The operator then places the filled bag next to the seedling or small plant, so that said drip-control disk is as close to the base of said seedling or small plant as practical. The water from the bag then follows a flowpath 13 as it passes slowly through the holes in the bag, then laterally through the compressed filter paper, down through the concentric center holes in the lower plastic and gasket sheets, and into the soil surrounding the roots of the seedling or small plant. The desired 2-3 week period in which the bag empties its full capacity is achieved through the design, manufacture, and testing of said drip-control disks under actual operating conditions.

The water from the bag then follows a flowpath 13 as it passes slowly through the holes in the bag, then laterally through the compressed filter paper, down through the concentric center holes in the lower plastic and gasket sheets, and into the soil surrounding the roots of the seedling or small plant. The desired 2-3 week period in which the bag empties its full capacity is achieved through the design, manufacture, and testing of said drip-control disks under actual operating conditions.

The specific size, shape, and materials of the bag, and the dimensions of the component parts, as described in the above paragraphs, are intended to illustrate the principles of this device, but said descriptions are not intended to restrict this invention to the specific details included herein.

I claim:

1. A device for irrigating tree seedlings and other small plants, which consists of: (1) a bag capable of containing water which is constructed of flexible, biodegradable plastic made of cornstarch or other similar material, said bag having a top filling opening which can be sealed by means of a strip of double-back paper tape, and said bag having a hole or holes in its lower area; and (2) a multi-layered disk consisting of two thin sheets of plastic, both said plastic sheets having one side coated with adhesive and one said plastic sheet containing a small center hole, and one sheet of laboratory filter paper, so that when the layers of said plastic sheets and filter paper are assembled and compressed together and then attached to said bag by a sheet of adhesive-sided gasket material, said gasket sheet being slightly larger in area than the plastic and filter paper sheets and also having a small center hole, so that the edge of said compressed assembly is located directly over said hole or holes in the lower area of said bag; so that said multi-layered disk can control the passage of water from said bag into the plant soil at the desired slow rate as determined by testing.

\* \* \* \* \*